United States Patent
Laenen et al.

(10) Patent No.: US 7,175,314 B2
(45) Date of Patent: Feb. 13, 2007

(54) UNIDIRECTIONAL LIGHTING DEVICE FOR ILLUMINATING OBJECTS AND/OR FOR MARKING LANES, PREFERABLY IN THE AIRPORT AREA

(75) Inventors: Guy Laenen, Westerlo (BE); Jean-Claude Vandevoorde, Steenkokkerzeel (BE); Louis Willems, Landen (BE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/561,364

(22) PCT Filed: Jun. 18, 2004

(86) PCT No.: PCT/EP2004/006623

§ 371 (c)(1),
(2), (4) Date: Dec. 19, 2005

(87) PCT Pub. No.: WO2005/000679

PCT Pub. Date: Jan. 6, 2005

(65) Prior Publication Data

US 2006/0146536 A1    Jul. 6, 2006

(30) Foreign Application Priority Data

Jun. 30, 2003    (DE) ................ 103 29 496

(51) Int. Cl.
*F21V 21/30* (2006.01)
*F21V 21/02* (2006.01)

(52) U.S. Cl. ............. 362/269; 362/275; 362/419

(58) Field of Classification Search .......... 362/269, 362/275, 282, 285, 287, 322, 371, 372, 418, 362/419, 427, 428

See application file for complete search history.

(56) References Cited

U.S. PATENT DOCUMENTS

| 1,871,205 | A |   | 8/1932  | Werner |
|-----------|---|---|---------|--------|
| 1,881,262 | A | * | 10/1932 | Conradty ............ 362/269 |
| 3,755,665 | A | * | 8/1973  | Grindle .............. 362/418 |
| 3,991,905 | A |   | 11/1976 | Nicpon |
| 4,722,032 | A |   | 1/1988  | Kulka |
| 4,920,468 | A |   | 4/1990  | Narita |
| 5,289,358 | A | * | 2/1994  | Halemeier ........... 362/275 |
| 5,584,574 | A |   | 12/1996 | Haddad |
| 5,988,833 | A |   | 11/1999 | Giese et al. |

FOREIGN PATENT DOCUMENTS

| DE | 1 835 477 U | 7/1961 |
|----|-------------|--------|
| GB | 923503      | 8/1959 |

OTHER PUBLICATIONS

ADB, A Siemens Company, "Approach, Threshold Runway End High Intensity Elevated Light", Apr. 11, 1997, pp. 1-4, Order No. E1001-T95-A61-V1-7600.

* cited by examiner

*Primary Examiner*—Y. My Quach-Lee

(57) ABSTRACT

The invention relates to a unidirectional lighting device for illuminating objects and/or for marking lanes, preferably in the airport area. Said device comprises a base having an external housing for placing and fastening the lighting device and optical components which comprise at least one light source, one reflector and one front glass and which produce a light beam along an optical axis. The external housing does not consist of metal and the optical components are disposed in an optical module to be added on to the base, thereby providing a lighting device which is easy to maintain.

12 Claims, 4 Drawing Sheets

UNIDIRECTIONAL LIGHTING DEVICE FOR ILLUMINATING OBJECTS AND/OR FOR MARKING LANES, PREFERABLY IN THE AIRPORT AREA

CROSS REFERENCE TO RELATED APPLICATIONS

This application is the U.S. National Stage of International Application No. PCT/EP2004/006623, filed Jun. 18, 2004 and claims the benefit thereof. The International Application claims the benefits of German application No. 10329496.1, filed Jun. 30, 2003, both applications are incorporated by reference herein in their entirety.

FIELD OF INVENTION

The invention relates to a unidirectional lighting device for illuminating objects and/or for marking lanes, preferably in the airport area.

SUMMARY OF THE INVENTION

The publication entitled "Approach, Threshold Runway End High Intensity Elevated Light" published by ADB, a Siemens company, Apr. 11, 1997, order number E10001-T95-A61-V1-7600 discloses a unidirectional lighting device for marking the approach and threshold area as well as the takeoff and landing path limits of airports. The lighting device comprises a main body having an external housing which can be erected and fastened on the ground, a post or a mast. The lighting device also comprises optical components, specifically a light source, a reflector and a front glass for producing a parallel light beam.

A change of the light source in this known lighting device is possible without tools, but can only be carried out at the erection location in the field via a door which is arranged on the rear panel of the external housing. In order to perform workshop maintenance of the optical components, the complete lighting device must be taken down, transported to the workshop and then aligned again after re-erection. The main body of the lighting device consists of a cast aluminum external housing and noble metal parts, and corrosion resistance is therefore difficult to achieve and only partly possible.

The invention therefore addresses the problem of overcoming the aforementioned disadvantages of the prior art in the case of a lighting device of the type cited at the beginning, in particular of providing a lighting device whose maintenance is simplified.

According to the invention, the problem is solved by a lighting device of the type in question, said lighting device having the features described herein. As a result of the combination of the partly metallic optical components in a separate optics module which can be installed in the main body of the lighting device, and as a result of the construction of large parts of the external housing of the main body from non-metallic materials, a lower overall weight of the claimed lighting device is achieved, thereby making it easier to replace in the field. As a result of using non-metallic materials for the external housing, in particular a higher corrosion-resistance is achieved for a lighting device in accordance with the invention. Furthermore, the embodiment of the overall lighting device can be smaller, thereby reducing the wind sensitivity and therefore the danger of breakage. Consequently, it is possible to fasten a lighting device according to the invention onto higher masts than in the prior art. The non-metallic and therefore non-conducting construction of the external housing allows the insulated fastening of a drive amplifier of the lighting device, thereby allowing the reliable transmission of triggering signals even over cable lengths up to 250 m. The plastic construction of the external housing provides for greater flexibility in layout and production and for better frictional behavior. Due to the limited heat conductivity and electrical conductivity of non-metallic materials, there are fewer problems taking hold of and handling an external housing of corresponding construction.

In an advantageous embodiment of the claimed lighting device, the optics module is rotatably linked to the main body via pivoting means. As a result of this, the lighting device can be opened on site, i.e. at the erection location in the field, e.g. by swinging it open, thereby allowing unimpeded access to the built-in parts and in particular the optical components. It is therefore easy to undertake a replacement of the light source in situ, for example.

In a preferred embodiment of the invention, the optics module is designed to be removable from the main body of the lighting device. The separability of the optics module means that it can be maintained in the workshop without the need to take down the complete lighting device. For example, the pivoting means can be designed in such a way that the optics module can be detached from the main body without using tools.

In a preferred embodiment of the claimed lighting device, an upper part of the main body, which upper part accommodates the optics module, is designed relative to a lower part of the main body, which lower part carries the upper part, such that it can be tilted about a horizontal axis and rotated about a vertical axis. With the aid of this design, it is possible to perform an orientation of the optical axis of the parallel light beam which is emitted by the optics module. It is particularly advantageous that, when a tilt and rotate position has been set, the upper part does not change in relation to the lower part if the optics module is swung open or removed. Consequently, a time-consuming readjustment of the lighting device is no longer required if a lamp is changed or in the case of maintenance tasks.

In a preferred configuration of the claimed lighting device, adjusting means are provided for setting and fixing the tilt position of the upper part relative to the lower part of the main body. For this purpose, provision is made for a mechanism having two adjustment screws which engage in a diametrically opposed manner and fix the upper part in a set tilt position. In order to change the tilt position, one of the two adjustment screws is unscrewed by the same amount as the other adjustment screw is tightened, wherein the upper part is tilted about the horizontal axis of rotation. As a result of this adjustment mechanism, it is possible to achieve a very accurate orientation of the angle of the optical axis relative to the vertical. The axial position of an adjustment screw is preferably fixed by a lock nut which engages in the housing. This ensures a locking of the tilt position of the upper part relative to the lower part of the main body of the lighting device according to the invention.

In a further preferred configuration of the invention, locking means are provided for fixing the rotational position of the upper part relative to the lower part of the main body. As a result, it is likewise possible to fix a set orientation of the optical axis of the light beam in the form of an azimuthal angle relative to a base position.

The non-metallic external housing of the main body is preferably designed as a plastic part, in particular an injection molded part. In this way, stable non-metallic external housings can be provided at low manufacturing cost for lighting devices in accordance with the invention.

BRIEF DESCRIPTION OF THE DRAWINGS

Further properties and advantages of the claimed lighting device are derived from the following description of the drawings, in which:

DETAILED DESCRIPTION OF INVENTION

Figure 1:
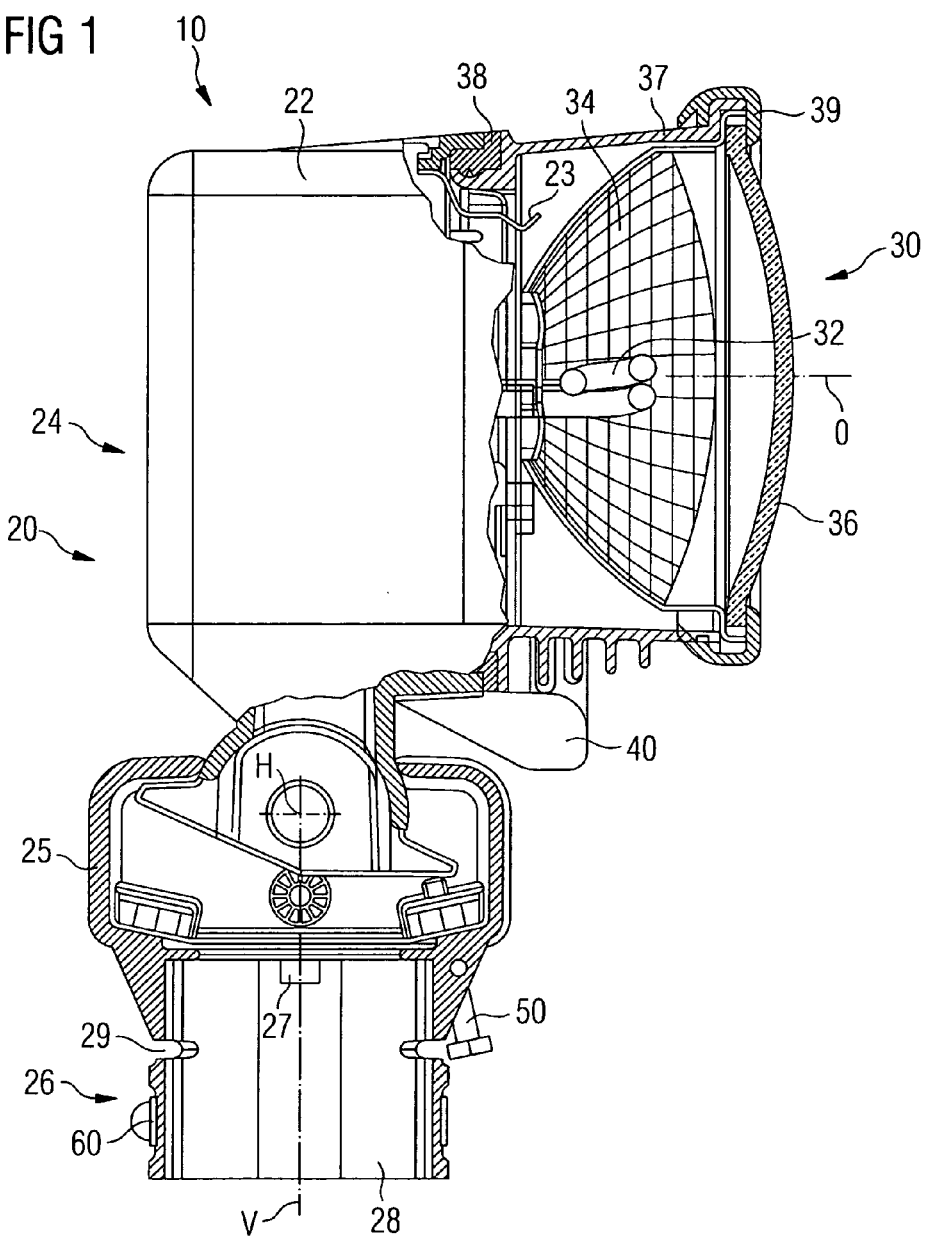
FIG. 1 schematically illustrates a partly cutaway side view of a lighting device according to the invention.

As shown in FIG. 1, a lighting device 10 according to the invention has a main body 20 for erecting and fastening the lighting device 10 and an optics module 30 for generating a light beam along an optical axis O. The main body 20 is enveloped by a non-metallic external housing 22 and essentially comprises an upper part 24, an intermediate part 25 and a lower part 26. The optics module 30 is laterally attached to the upper part 24 of the main body 20, which upper part also contains electrical components for controlling and operating the optics module 30. The upper part 24 is supported on the intermediate part 25 by means of a hinge bolt which is aligned longitudinally along a horizontal axis of rotation H, and is therefore tiltably positioned about the axis of rotation H which extends perpendicularly to the page plane. The intermediate part 25 of the main body 20 is rotatably positioned on the lower part 26 about a vertical axis V. For this purpose, the intermediate part 25 is centered over a bearing journal 27 in the supporting pillar 28 of the lower part 26. The assembly comprising intermediate part 25, upper part 24 and optics module 30 is therefore rotatably configured about the vertical axis of rotation V relative to the non-rotatable lower part 26. A radial necking 29 is formed in the supporting pillar 28 of the lower part 26, providing a predetermined breaking point if the claimed lighting device 10 is positioned on the ground.

The optics module 30 has a housing 37 which is adapted to the lateral cross-section of the external housing 22 and in which are arranged a parabolic reflector 34 and a light source 32 in the form of a halogen lamp, said light source being approximately central. The housing 37 is covered on a front side, which is provided for the issue of light, by a front glass 36 that is fastened to the housing 37 by means of a front ring 39 which runs around the circumference of the front glass 36. Depending on the desired color of the issuing light beam, the front glass 36 is clear or colored red or green.

The optics module 30 is rotatably linked to the upper part 24 of the main body 20 via pivoting means 40 having the form of a hinge. In this way, the optics module 30 can be swung downwards for changing the light source 32 or for other maintenance tasks, in order to gain access to the rear panel of the housing 37 or to the interior of the housing 22. Upon completion of the tasks, the optics module 30 is swung upwards again until a seal 38 which surrounds the housing 37 is flush with the external housing 22 of the upper part 24 and the spring keeper 23 in an engaged locking position in the rear panel of the housing 37 secures the optics module 30. In order to swing open again, the spring force of the keeper 23 must be overcome.

At the erection location, whether embedded in the ground via the supporting pillar 28 or supported on a post or mast above the ground, the alignment of the optical axis O must be adjusted. The polar and azimuthal angles can be set via the horizontal or vertical axes of rotation H or V. In order to set the polar angle, i.e. the inclination of the optical axis O relative to the vertical, adjusting means 50 are provided in the form of a pair of adjusting screws which are screwed into the intermediate part 25 diagonally from below. The ends of the adjusting screws touch surfaces of the upper part 24 which is arranged rotatably about the horizontal axis of rotation H, wherein only the right-hand adjusting screw of the two adjusting screws is illustrated in FIG. 1. In this case, it is only possible to screw in one of the adjustment screws if the other adjustment screw is unscrewed. The adjusting means 50 which are designed in this way allow a very precise adjustment of the tilt position of the upper part 24 relative to the lower part 26 of the main body 20. Once it has been set, a tilt position can be locked by lock nuts. The setting of the azimuthal angle, i.e. the orientation relative to a celestial direction, is achieved by rotating the assembly which is supported by the lower part 26 about the vertical axis of rotation V. In order to fix a set rotation position, provision is made for locking means 60 in the form of a clamping ring, wherein said locking means grip the external housing of the intermediate part 25 and squeeze it against the supporting pillar 28 when tightened.

The claimed lighting device 10 device is used e.g. as a signaling entity for air navigation or for other traffic areas, in particular for the approach area, the threshold markings and end markings of landing paths at airports. The non-metallic plastic construction of the external housing 22 of the main body 20 results in a lower weight, thereby facilitating the replacement in the field of a lighting device 10 according to the invention, and greater corrosion resistance, thereby extending the service life of the lighting device 10. This design also allows smaller dimensions, resulting in reduced wind sensitivity, thereby improving the fragility of a lighting device 10 according to the invention. Furthermore, it is possible to attach the lighting device 10 having smaller overall dimensions to higher fastening masts. The tilt mechanism is situated in the interior of the main body 20 in the case of a lighting device 10 according to the invention, and is therefore attached in a protected manner. The same main body 20 is suitable for optics modules operating as both continuous and flashing lights. The lighting device 10 is protected by seals against ingress of water or dust. Power cables are entirely encased within the main body 20 and are therefore likewise protected.

Figure 2:
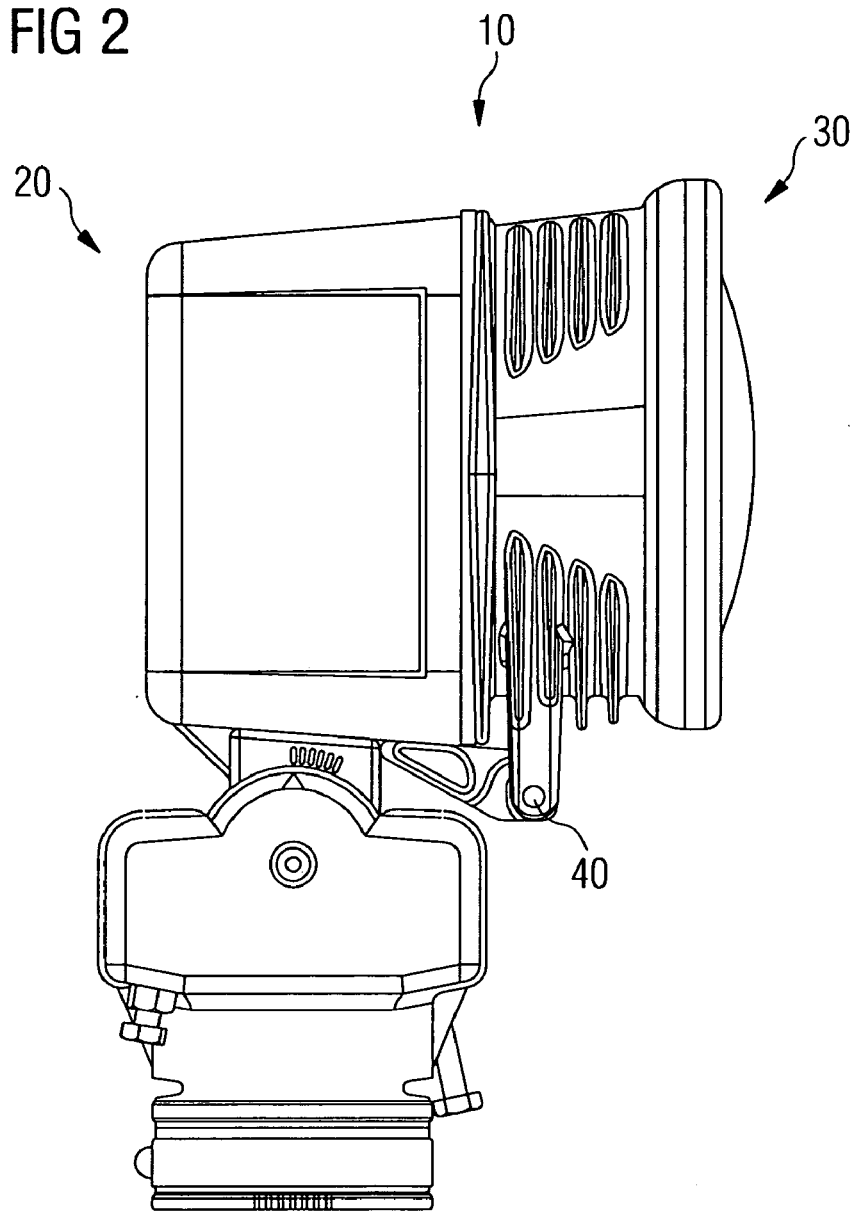
FIG. 2 schematically illustrates a lighting device according to the invention, including an optics module in a closed state.
Figure 3:
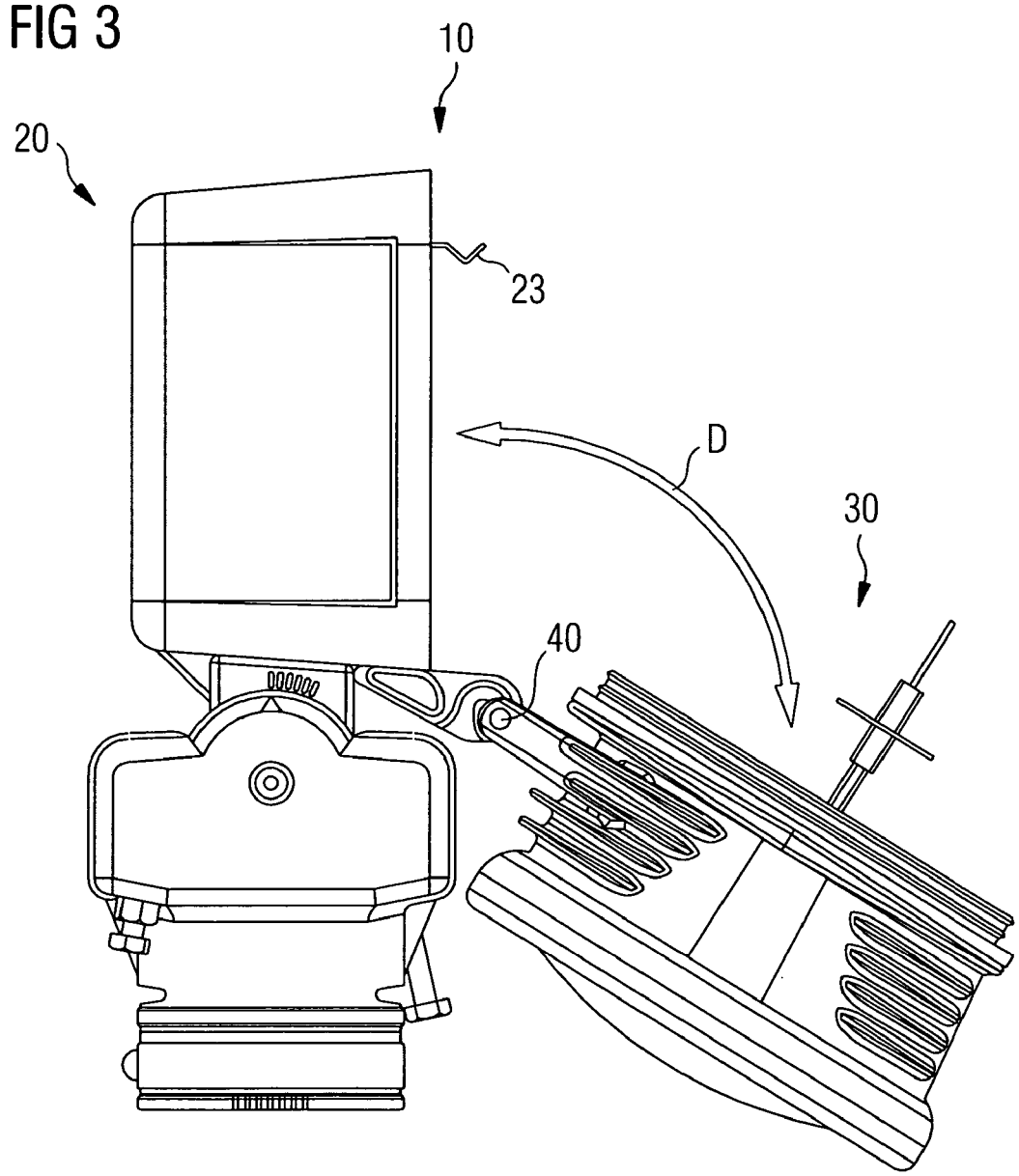
FIG. 3 schematically illustrates a lighting device according to the invention, including an optics module in a swung open state.
Figure 4:
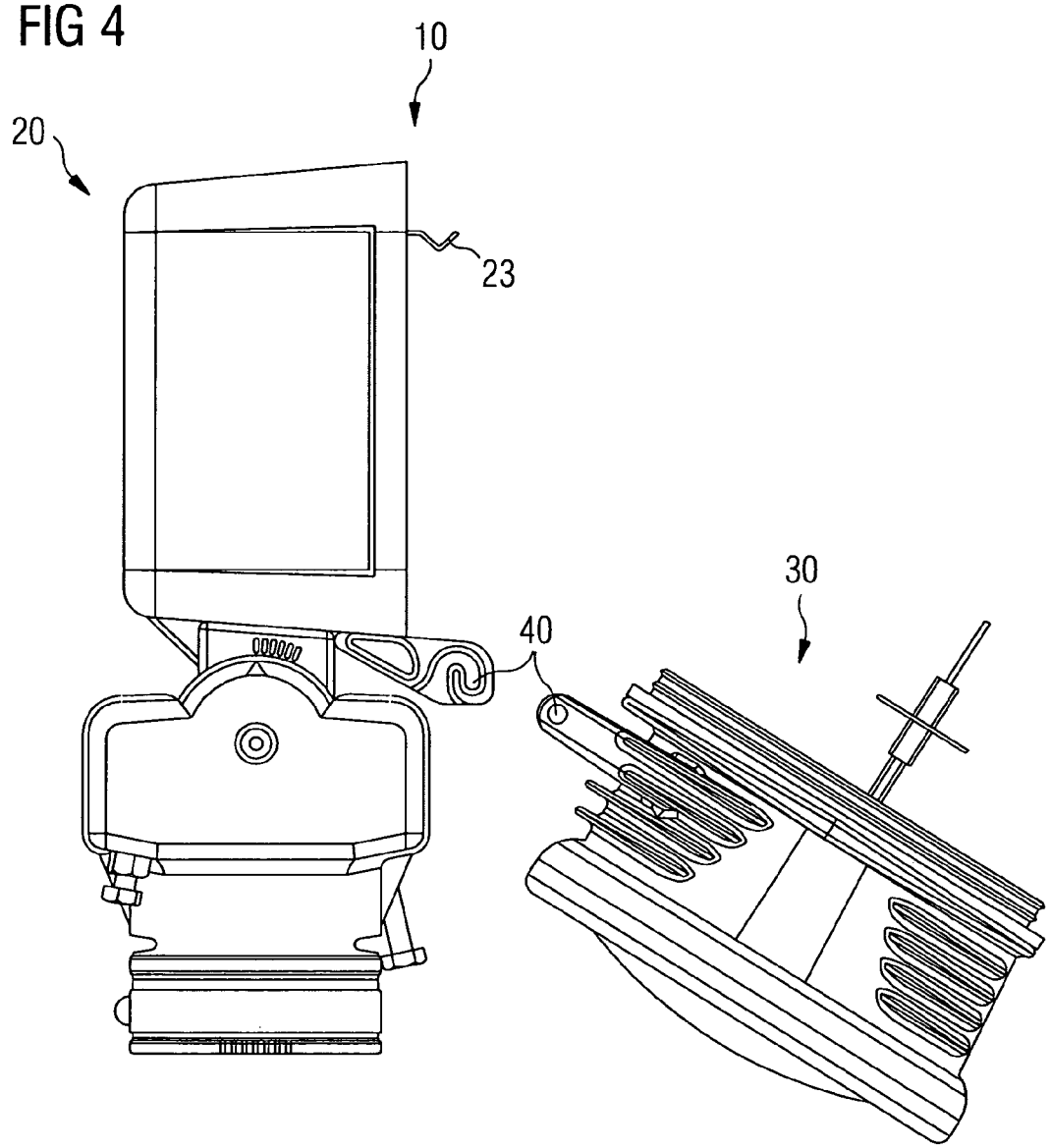
FIG. 4 schematically illustrates a lighting device according to the invention, including an optics module in a separated state.

An essential advantage of the lighting device 10 according to the invention relates to the increased ease of maintenance and is illustrated subsequently in FIG. 2 to FIG. 4. FIG. 2 shows a lighting device 10 having a main body 20 to which the optics module 30 is linked via pivoting means 40, wherein the optics module 30 is swung upwards and fixed to the main body 20 and is therefore in an operating position. In order to change the light source 32, for example, the optics module 30 is pivoted downwards as per the direction arrow D such that free access exists to the rear panel of the optics module 30. Following replacement of the light source or following other maintenance tasks which can be performed on site, the optics module 30 is swung upwards via the pivoting means 40 which are designed as a hinge, until the keeper 23 is snapped into its locking position. If a complete replacement of the optics module 30 is required or if more extensive maintenance of the optics module is required in the workshop, the optics module 30 can be entirely detached from the main body 20 as illustrated in FIG. 4. This can be achieved by removing the pins which are arranged at retaining plates of the optics module 30 from a voluted supporting plate of the main body 20, without the need for a disassembly tool.

The invention claimed is:

1. A unidirectional lighting device for illuminating objects and/or for marking lanes, preferably in the airport area, having:
   a main body for erecting and fastening the lighting device, said main body including an external housing, and having optical components for generating a light beam along an optical axis, the optical components including at least a light source, a reflector and a front glass, wherein the optical components are arranged in an optics module which can be attached to the main body, the external housing is non-metallic and that the optics module is rotatably linked to the main body via a pivoting means, wherein the optics module can be swung between an operating position in which it is fixed to the main body, and an opened maintenance position giving unimpeded access to the optical components, wherein the main body has an upper part that includes the optics module, with the upper part being fixed to a lower part in tiltable relation about a horizontal axis and rotatable about a vertical axis in relation to the lower part of the main body, wherein the lower part supports the upper part.

2. The lighting device as claimed in claim 1, further having an adjusting device for adjusting and fixing the tilt position of the upper part relative to the lower part of the main body.

3. The adjusting means as claimed in claim 1, further having a locking device for fixing the rotational position of the upper part relative to the lower part of the main body.

4. A unidirectional lighting device for illuminating objects and/or for marking lanes, preferably in the airport area, having:
   a main body for erecting and fastening the lighting device, said main body including an external housing, and having optical components for generating a light beam along an optical axis, the optical components including at least a light source, a reflector and a front glass, wherein the optical components are arranged in an optics module which can be attached to the main body, the external housing is non-metallic and that the optics module is rotatably linked to the main body via a pivoting means, wherein the optics module can be swung between an operating position in which it is fixed to the main body, and an opened maintenance position giving unimpeded access to the optical components; and
   wherein the main body has an upper part that includes the optics module, with the upper part being fixed to a lower part in tiltable relation about a horizontal axis for adjusting the optical axis, the horizontal axis being an axis independent from the pivoting means.

5. The lighting device as claimed in claim 4, wherein the optics module is separable from the main body.

6. The lighting device as claimed in claim 4, wherein the non-metallic external housing of the main body is consisting of suitable form of plastic.

7. The lighting device as claimed in claim 6 wherein the main body is formed using the process of injection molding.

8. The lighting device as claimed in claim 4 further comprising the upper part being fixed to the lower part about a vertical axis for rotating the upper part in relation to the lower part, the vertical axis being en axis independent from the pivoting means.

9. A lighting device for illuminating objects, the lighting device comprising:
   a main body including an upper part supported by a lower part so that the upper part is movable about at least one axis in relation to the lower part for adjusting an optical axis;
   means for locking the upper part in fixed relation to the lower part;
   an optics module having optical components for generating a light beam along the optical axis; and
   pivoting means for releasably attaching the optics module with the upper part so that the optics module may be removed from the main body without varying the optical axis.

10. The lighting device of claim 9 wherein the upper part is fixed to the lower part in tiltable relation about a horizontal axis and rotatable about a vertical axis in relation to the lower part.

11. The lighting device of claim 10, the means for locking the upper part in fixed relation to the lower part comprising lock nuts for locking the upper part in fixed relation to the lower part about the horizontal axis and a clamping ring for locking the upper part in fixed relation to the lower part about the vertical axis.

12. The lighting device of claim 9, the pivoting means for releasably attaching the optics module with the upper body without varying the optical axis comprising a voluted hinge having an upwardly extending open end for receiving corresponding pins of the optics module.

* * * * *